US008804657B2

(12) United States Patent
Roberts et al.

(10) Patent No.: US 8,804,657 B2
(45) Date of Patent: Aug. 12, 2014

(54) METHOD AND APPARATUS FOR TRANSITIONING FROM A FIRST RAT TO A SECOND RAT

(75) Inventors: Gideon Roberts, Surrey (GB); Sukhdev Saini, Surrey (GB)

(73) Assignee: BlackBerry Limited, Waterloo, Ontario (CA)

( * ) Notice: Subject to any disclaimer, the term of this patent is extended or adjusted under 35 U.S.C. 154(b) by 646 days.

(21) Appl. No.: 12/463,124

(22) Filed: May 8, 2009

(65) Prior Publication Data

US 2009/0286542 A1 Nov. 19, 2009

Related U.S. Application Data

(60) Provisional application No. 61/052,085, filed on May 9, 2008.

(51) Int. Cl.
*H04W 4/00* (2009.01)
*H04W 36/00* (2009.01)

(52) U.S. Cl.
USPC ............................ 370/331; 370/332; 455/436

(58) Field of Classification Search
USPC ................ 455/435.1–435.3, 436–444, 550.1,
455/552.1, 553.1, 556.1, 556.2, 310, 310.2,
455/328, 338, 331, 432.1–432.3,
455/418–422.1; 370/310.2, 328, 338, 331,
370/422.1, 432.1–432.3, 435.1–435.3,
370/436–444, 550.1, 552.1, 553.1, 556.1,
370/556.2, 310, 351–356, 10
See application file for complete search history.

(56) References Cited

U.S. PATENT DOCUMENTS 7,197,312 B2 * 3/2007 Gunaratnam et al. ........ 455/445

| | | | |
|---|---|---|---|
| 2002/0197992 A1* | 12/2002 | Nizri et al. ..................... | 455/435 |
| 2004/0116110 A1 | 6/2004 | Amerga et al. | |
| 2005/0288017 A1* | 12/2005 | Doumenc et al. .......... | 455/435.3 |
| 2006/0025137 A1* | 2/2006 | Ormson ......................... | 455/436 |
| 2006/0088009 A1* | 4/2006 | Gibbs et al. .................. | 370/338 |
| 2007/0173283 A1 | 7/2007 | Livet et al. | |
| 2007/0207824 A1 | 9/2007 | Bhattacharjee et al. | |
| 2008/0014940 A1* | 1/2008 | Parron et al. ................. | 455/436 |

FOREIGN PATENT DOCUMENTS

| | | | |
|---|---|---|---|
| EP | 1509052 A1 * | 2/2005 | .............. H04Q 7/38 |
| EP | 1610584 A1 | 12/2005 | |
| WO | 0103459 A1 | 1/2001 | |

OTHER PUBLICATIONS

3GPP TS 25.304 v.8.1.0; 3rd Generation Partnership Project; Technical Specification Group Radio Access Network; User Equipment (UE) Procedures in Idle Mode and Procedures for Cell Reselection in Connected Mode; Release 8; Mar. 2008; 41 pgs.
EPO Search and Examination Report; EP Application No. 09159767.4; Jul. 31, 2009; 8 pgs.

* cited by examiner

*Primary Examiner* — San Htun
(74) *Attorney, Agent, or Firm* — Conley Rose, P.C.; J. Robert Brown, Jr.

(57) ABSTRACT

A method, in a wireless communications device having a first protocol stack for use with a first radio access technology and a second protocol stack for use with a second radio access technology, the method for transitioning from a first radio access technology to a second radio access technology, the method comprising: maintaining a list of available communication cells associated with the second radio access technology, and transferring information associated with more than one available communication cell associated with the second radio access technology from the first protocol stack to the second protocol stack.

11 Claims, 4 Drawing Sheets

METHOD AND APPARATUS FOR TRANSITIONING FROM A FIRST RAT TO A SECOND RAT

CROSS-REFERENCE TO RELATED APPLICATIONS

The present application claims priority to U.S. Provisional Patent Application No. 61/052,085, filed May 9, 2008, by Gideon Roberts, et al, entitled "Method and Apparatus for Transitioning From a First RAT to a Second RAT", which is incorporated by reference herein as if reproduced in its entirety.

TECHNICAL FIELD

This application relates to telecommunication systems in general, having for example application in UMTS (Universal Mobile Telecommunications System) and in particular relates to a method and apparatus for transitioning from a first Radio Access Technology (RAT) to a second Radio Access Technology (RAT).

BACKGROUND

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that this disclosure is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

BRIEF DESCRIPTION OF THE DRAWINGS

Embodiments will now be described, by way of example only, with reference to the attached drawings, in which.

DETAILED DESCRIPTION OF THE DRAWINGS

Figure 1:
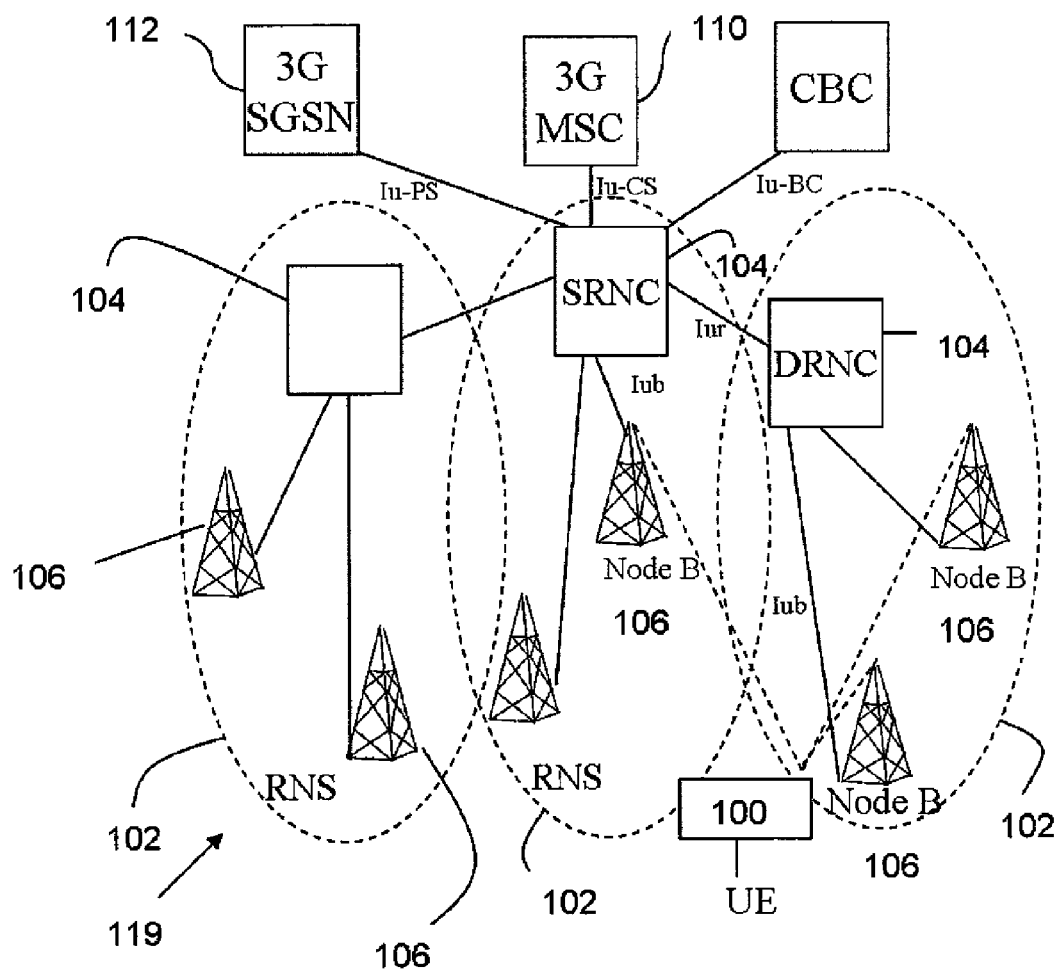
FIG. 1 is a schematic diagram showing an overview of a network and a UE device.

Consider a wireless mobile device, generally referred to as user equipment (UE), which complies with the 3GPP specifications for the UMTS protocol. The 3GPP 25.304 specification, v 7.1.0, incorporated herein by reference and referred to herein as the 25.304 specification, addresses the subject of User Equipment (UE) procedures in idle mode and procedures for cell reselection in connected mode.

Section 5.2 of the 25.304 specification defines cell selection and reselection in idle mode. This applies to UEs that support at least a UMTS (3G) network. Different types of measurements are used in different RATs and modes for cell selection and reselection. The performance requirements for the measurements are specified in 3GPP TS 25.133 "Requirements for Support of Radio Resource Management (FDD)" and 3GPP TS 25.123 "Requirements for Support of Radio Resource Management (TDD)", both incorporated herein by reference. The non-access stratum can control the RAT(s) in which the cell selection should be performed, for instance by indicating RAT(s) associated with the selected Public Land Mobile Network (PLMN), and by maintaining a list of forbidden registration area(s) and a list of equivalent PLMNs. The UE selects a suitable cell and the radio access mode based on idle mode measurements and cell selection criteria.

In order to speed up the cell selection process, stored information for several RATs may be available in the UE. When camped on a cell, the UE shall regularly search for a better cell according to the cell reselection criteria. If a better cell is found, that cell is selected. The change of cell may imply a change of RAT. The non-access stratum is informed if the cell selection and reselection results in changes in the received system information. For normal service, the UE has to camp on a suitable cell, tune to that cell's control channel(s) so that the UE can receive system information from the PLMN.

Section 5.2.5.1 of the 25.304 specification defines the UE activity in a camped normally state for the case of connection to a UMTS cell. When camped normally, the UE performs necessary measurements for the cell reselection evaluation procedure. The UE also executes the cell reselection evaluation process when appropriately triggered. The cell reselection evaluation process may be triggered by a UE internal trigger or when information on the broadcast control channel (BCCH) used for the cell reselection evaluation procedure has been modified.

Problems with inter-RAT cell reselection in a UE have been identified, particularly in the case of an inter-RAT cell reselection from a 2G RAT (such as GSM or GPRS) to a 3G RAT (such as UMTS). There are thus proposed strategies for a method and apparatus for transitioning from a first RAT to a second RAT. A number of such strategies are detailed below.

Other aspects and features of the proposed strategy will become apparent to those ordinarily skilled in the art upon review of the following description of specific embodiments of a method and apparatus for transitioning from a first RAT to a second RAT.

In the case where a UE is connected to a 2G network, it maintains a list of UMTS cells that it could use. When the UE determines it should transition to a UMTS cell, it selects the one with the biggest Received Signal Code Power (RSCP) value. The 2G protocol stack of the UE transfers this information for this cell to the 3G protocol stack which tries to connect to it.

However, it is possible that the 3G cell for which the information is transferred is not suitable for communication. The parameters required to determine if the 3G cell is suitable for the UE are broadcast on the Broadcast Control Channel (BCCH). If the 3G protocol stack finds that the 3G cell for which the information is transferred is not suitable for communication, then the 3G protocol stack must signal back to the 2G protocol stack for details of alternative 3G cells. This signaling between the protocol stacks delays the initiation of the transfer and can result in a communication disruption between the UE and the network.

According to the method disclosed herein, the information for more than one UMTS cell is transferred from the 2G protocol stack to the 3G protocol stack, such that if the first 3G cell is not suitable, then the UE can try the next one that was transferred, without having to refer back to the 2G protocol stack.

The method disclosed herein thus reduces the amount of signaling required between the 2G and 3G protocol stacks during inter-RAT cell reselection.

The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
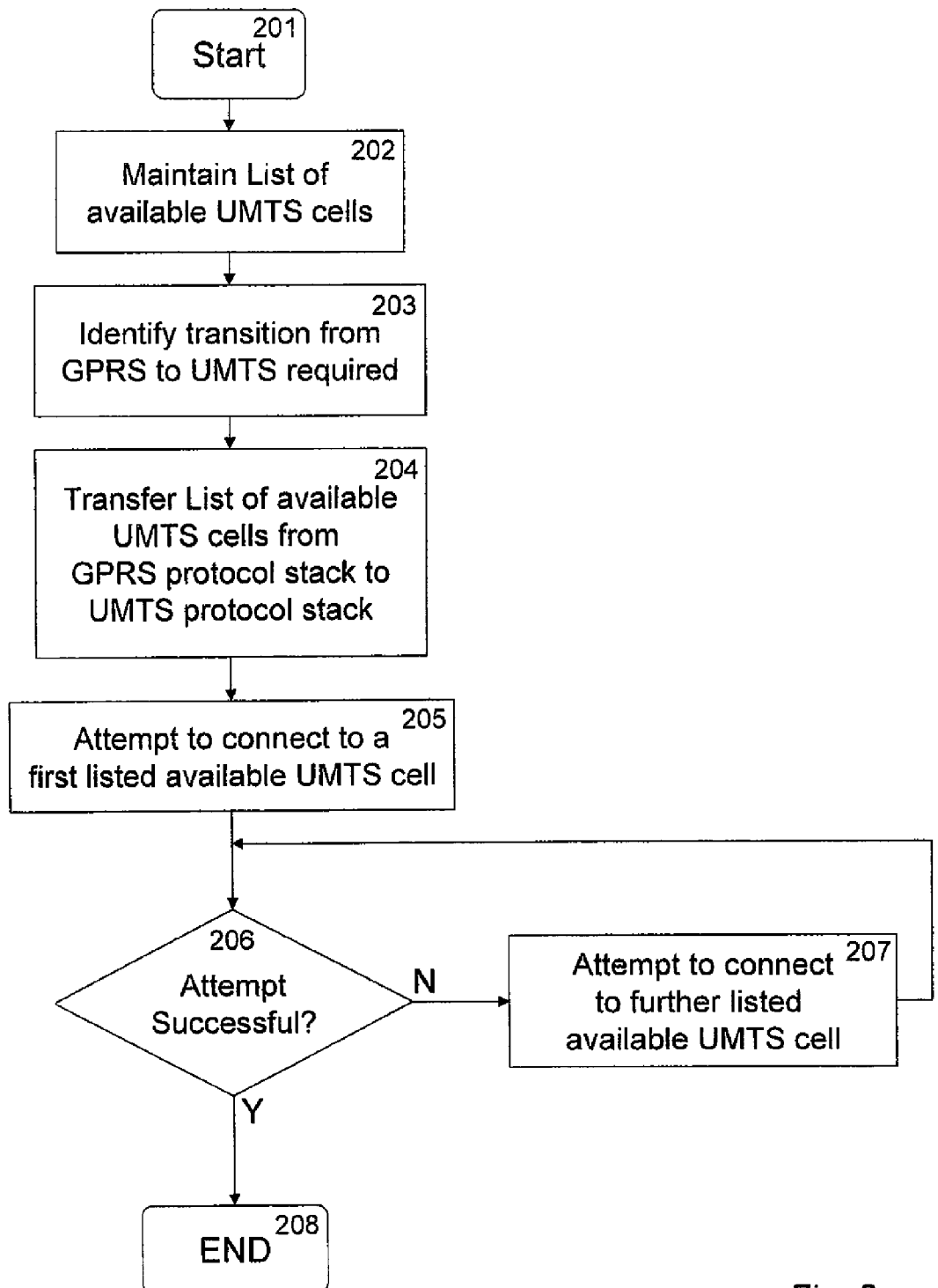
FIG. 2 is a flow diagram showing, at a high level, a process performed by the UE during an inter-RAT cell reselection as described herein.

FIG. 2 is a flow diagram showing, at a high level, a process performed by the UE during inter-RAT cell reselection as described herein. At 201 the method is initiated. While operating on a GPRS (2G) network the UE maintains a list of available UMTS (3G) cells, as shown at 202. This list is maintained by the GPRS protocol stack. At 203 the UE identifies that a transition is required from GPRS to UMTS. At 204 the UE transfers the list of available UMTS cells from the GPRS protocol stack to the UMTS protocol stack. At 205 the UE attempts to connect to a first listed available UMTS cell. At 206 a determination is made as to whether the attempt was successful. If the attempt was not successful, then the UE attempts to connect to a further available UMTS cell as listed in the list transferred from the GPRS protocol stack to the UMTS protocol stack. If the attempt was successful, then the method ends at 208.

As used herein, "list" is understood to mean any method and organization of data that allows the stack software for a RAT to keep track of a plurality of sets of data, each set of data being the data associated with an available cell and retrievable in any manner associable with the cell. No particular relationship or ordering between the sets of data is implied, other than having the property of being retrievable by the stack software. One exemplar embodiment would be a formal list structure, each list element having pointers or data structures configured to contain, or otherwise enable retrieval of, the data in a particular data set. The method used to organize the list elements could be implemented using any of the ways known to person of skill in the applicable software engineering arts. Further other data structures can be used as well, as would be known to a person of skill in the software engineering arts.

Figure 3:
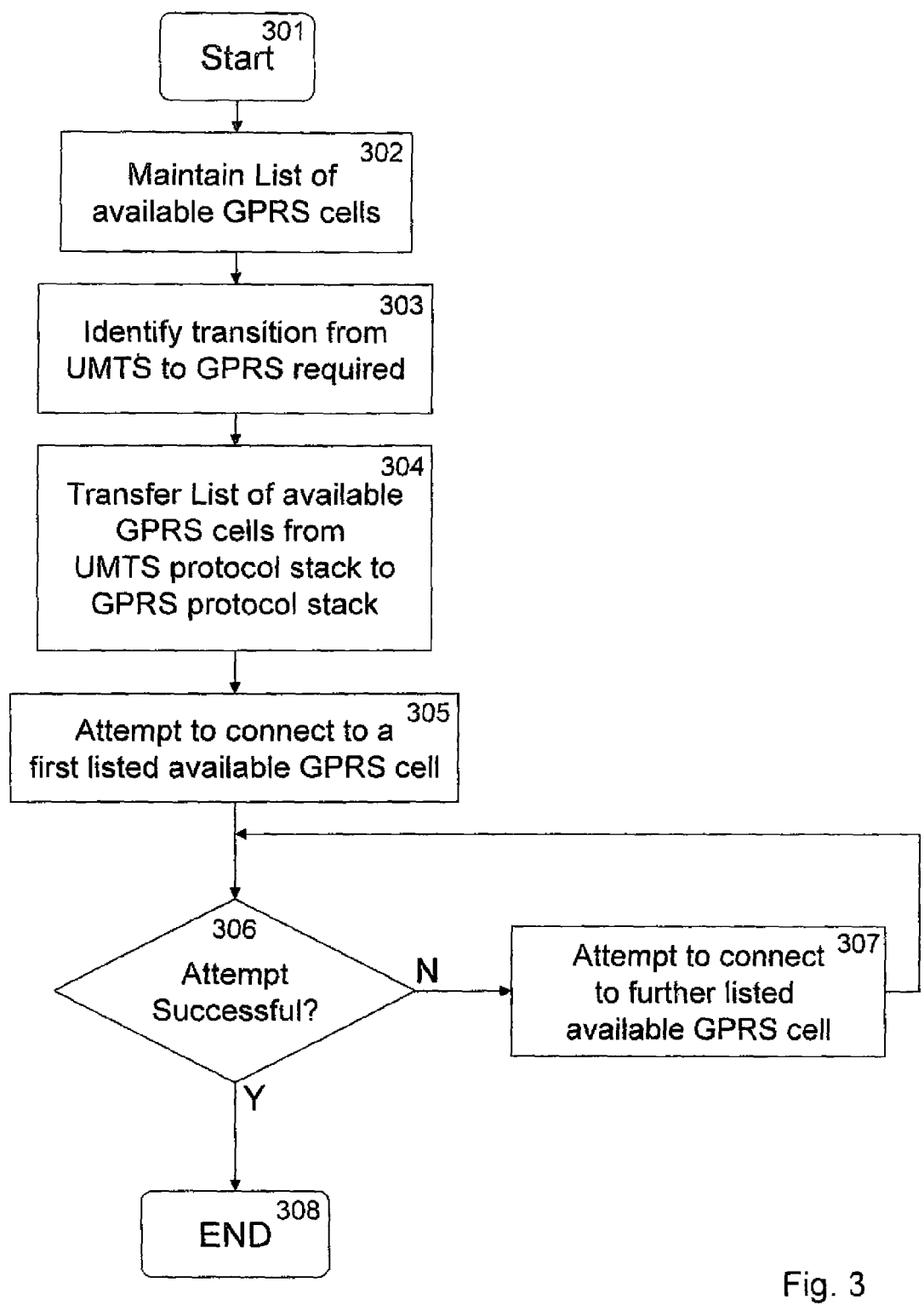
FIG. 3 is a flow diagram showing, at a high level, a process performed by the UE during an alternative inter-RAT cell reselection.

FIG. 3 is a flow diagram showing, at a high level, a process performed by the UE during an alternative inter-RAT cell reselection as described herein. At 301 the method is initiated. While operating on a UMTS (3G) network the UE maintains a list of available GPRS (2G) cells, as shown at 302. This list is maintained by the UMTS protocol stack. At 303 the UE identifies that a transition is required from UMTS to GPRS. At 304 the UE transfers the list of available GPRS cells from the UMTS protocol stack to the GPRS protocol stack. At 305 the UE attempts to connect to a first listed available GPRS cell. At 306 a determination is made as to whether the attempt was successful. If the attempt was not successful, then the UE attempts to connect to a further available GPRS cell as listed in the list transferred from the UMTS protocol stack to the GPRS protocol stack. If the attempt was successful, then the method ends at 308. Where comments are made below with reference to FIG. 2, these could also be applied to FIG. 3.

While operating on a GPRS (2G) network the UE is required to make measurements on cells of other radio access technologies. These requirements are given in 3GPP specification TS 05.08 v 8.15.0, incorporated herein by reference and referred to herein as the 05.08 specification. Section 6.6.4 of the 05.08 specification states that for a multi-RAT UE, cells or frequencies with other radio access technologies may be included in 3G Cell Reselection list (see 3GPP TS 04.18, incorporated herein by reference). The network controls the measurements for reselection of these cells by the parameter Qsearch_I broadcast on BCCH. Qsearch_I defines a threshold and also indicates whether these measurements shall be performed when RLA_C (a running average of received signal level) of the serving cell is below or above the threshold. These measurements may be performed less frequently than measurements of GSM cells, in order to conserve UE power. The UE is able to identify and select a new best UTRAN cell on a frequency, which is part of the 3G Cell Reselection list, within 30 seconds after it has been activated under the condition that there is only one UTRAN frequency in the list and under good radio conditions.

Section 6.6.5 of the 05.08 specification describes the algorithm implemented for determining cell reselection from GPRS (or GSM) to UTRAN. If the 3G Cell Reselection list includes UTRAN frequencies, the UE updates the value RLA_C for the serving cell and each of the at least 6 strongest non-serving GSM cells at least every 5 seconds. The UE then reselects a suitable UTRAN cell if its measured RSCP value exceeds the value of RLA_C for the serving cell and all of the suitable non-serving GSM cells by the value XXX_Qoffset for a period of 5 seconds and, for FDD, the UTRAN cells measured ratio of energy per modulating bit to the noise spectral density ("Ec/No") value is equal or greater than the value FDD_Qmin. In case of a cell reselection occurring within the previous 15 seconds, XXX_Qoffset is increased by 5 dB. Ec/No and RSCP are the measured quantities; FDD_Qmin and XXX_Qoffset are broadcast on BCCH of the serving cell. XXX indicates other radio access technology/ mode. Note that the parameters required to determine if the UTRAN cell is suitable are broadcast on BCCH of the UTRAN cell. A UE may start reselection towards the UTRAN cell before decoding the BCCH of the UTRAN cell, leading to a short interruption of service if the UTRAN cell is not suitable. If more than one UTRAN cell fulfils the above criteria, the UE would usually select the cell with the greatest RSCP value.

At 204 and 304 the UE transfers a list of available UMTS cells from the one protocol stack to another protocol stack. Taking 204 as an example, the transferred list comprises information relating to a plurality of UMTS cells, but not necessarily all UMTS cells in the list of available UMTS cells maintained by the GPRS protocol stack. The transferred list may comprise a subset of the list maintained by the GPRS protocol stack. This subset may be selected as a predetermined number of UMTS cells with the biggest current RSCP value, for example. Alternatively, the subset may be determined as all UMTS cells with RSCP values above a certain threshold.

If none of the UMTS cells in the transferred list are suitable for communication by the UE, then the 3G protocol stack refers back to the 2G protocol stack. Even in such a situation, the amount of signaling between the 3G and the 2G protocol stack is reduced because the 3G protocol stack has not had to refer back to the 2G protocol stack after each UMTS cell was found to be unsuitable.

Figure 4:
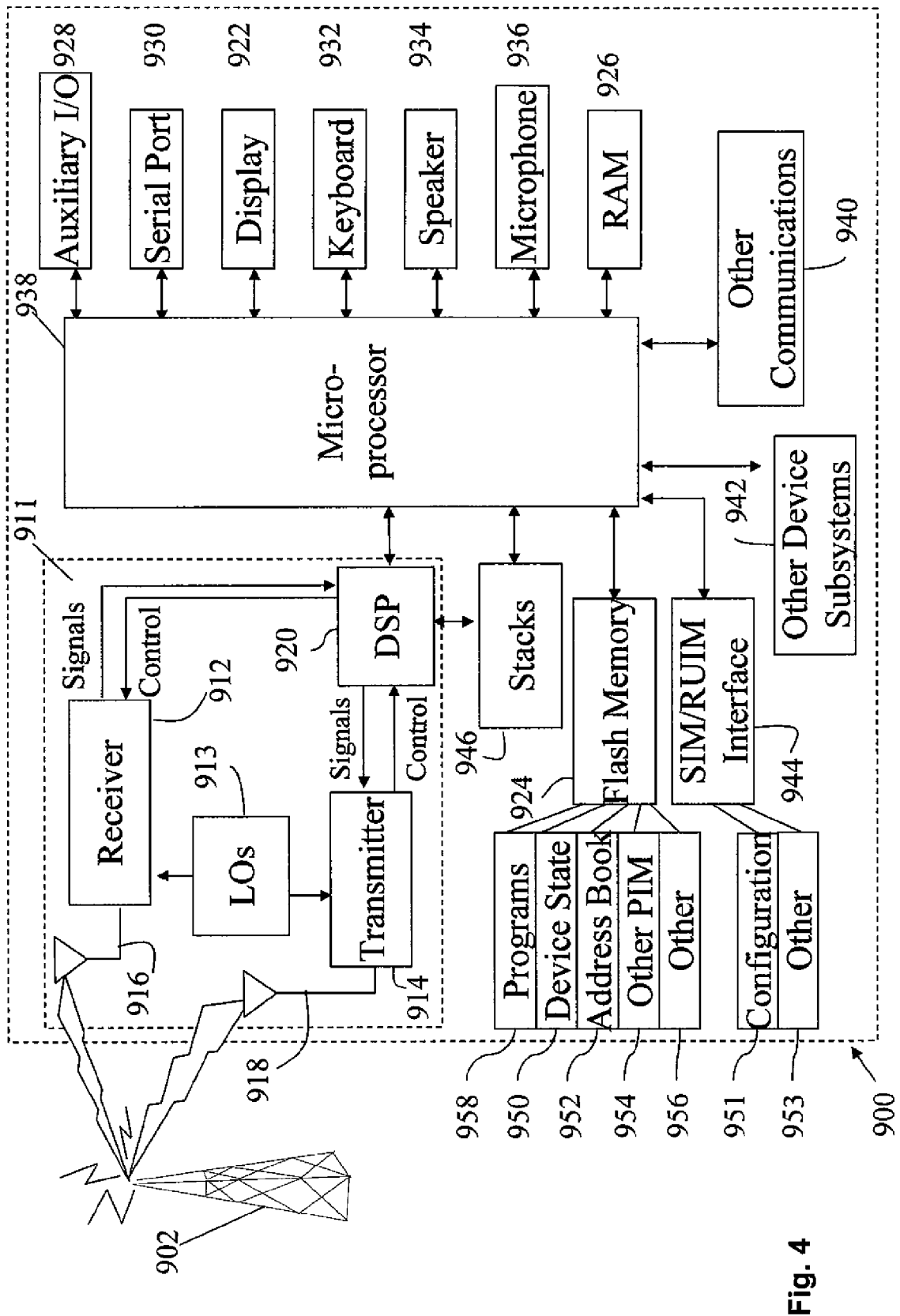
FIG. 4 is a block diagram illustrating a mobile device, which can act as a UE in accordance with the approach described herein.

Turning now to FIG. 4, this is a block diagram illustrating a mobile device, which can act as a UE and co-operate with the apparatus and methods of FIGS. 1 to 3, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 3, analog to digital (AND) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 4 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 4, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

EXTENSIONS AND ALTERNATIVES

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method, in a wireless communications device having a first protocol stack for use with a first radio access technology and a second protocol stack for use with a second radio access technology, the method for transitioning from a first radio access technology to a second radio access technology, the method comprising:

maintaining in the first protocol stack a list of available communication cells associated with the second radio access technology, identifying a requirement for a transition from the first radio access technology to the second radio access technology, before attempting to connect to the second radio access technology, transferring information from said list relating to more than one available communication cell associated with the second radio access technology from the first protocol stack to the second protocol stack;

attempting to connect to a first available communication cell associated with the second protocol stack using information in the second protocol stack associated with the first available communication cell, the information transferred from the first protocol stack to the second protocol stack; and if the attempt to connect to the first available communication cell is unsuccessful, attempting to connect to a further available communication cell associated with the second protocol stack using the information in the second protocol stack associated with the further available communication cell; in which the transferred list of cells comprises a subset of the list of available cells maintained in the first protocol stack, the subset determined as cells having a signal power measurement above a predetermined threshold.

2. A method according to claim 1, further comprising establishing a communication connection to a communication cell associated with the second radio access technology.

3. A method according to claim 1, wherein the first radio access technology is a second generation (2G) access technology.

4. A method according to claim 3, wherein the first radio access technology is Global System for Mobile Communications (GSM) or General Packet Radio Service (GPRS).

5. A method according to claim 1, wherein the second radio access technology is third generation (3G) access technology.

6. A method according to claim 5, wherein the second radio access technology is Universal Mobile Telecommunications System (UMTS).

7. A method according to claim 1, wherein the second radio access technology is a second generation (2G) access technology.

8. A method according to claim 7, wherein the second radio access technology is Global System for Mobile Communications (GSM) or General Packet Radio Service (GPRS).

9. A method according to claim 1, wherein the first radio access technology is third generation (3G) access technology.

10. A method according to claim 9, wherein the first radio access technology is Universal Mobile Telecommunications System (UMTS).

11. A wireless communications device comprising:
a processor configured to:
implement a first protocol stack for use with a first radio access technology and a second protocol stack for use with a second radio access technology, wherein the first protocol stack is adapted to maintain a list of available communication cells associated with the second radio access technology;

identify a requirement for a transition from the first radio access technology to the second radio access technology; and before attempting to connect to the second radio access technology, transfer information from said list relating to more than one available communication cell associated with the second radio access technology from the first protocol stack to the second protocol stack; and a communication subsystem coupled to the processor, wherein the communication subsystem is configured to:

attempt to connect to a first available communication cell associated with the second protocol stack using information in the second protocol stack associated with the first available communication cell, the information transferred from the first protocol stack to the second protocol stack;

if the attempt to connect to the first available communication cell is unsuccessful, attempt to connect to a further available communication cell associated with the second protocol stack using the information in the second protocol stack associated with the further available communication cell; and transition from a communication cell associated with the first radio access technology to a communication cell associated with the second radio access technology; in which the transferred list of cells comprises a subset of the list of available cells maintained in the first protocol stack, the subset determined as cells having a signal power measurement above a predetermined threshold.

* * * * *